(12) United States Patent
Lelarge et al.

(10) Patent No.: US 9,279,524 B2
(45) Date of Patent: Mar. 8, 2016

(54) PIPE FOR DRAWING UP COLD WATER FOR A MARINE THERMAL ENERGY PLANT

(75) Inventors: Virginie Lelarge, Larmor Plage (FR); Daniel Bathany, Plougastel Daoulas (FR); Raymond Begoc, Plouzane (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 13/638,084

(22) PCT Filed: Mar. 24, 2011

(86) PCT No.: PCT/FR2011/050624
§ 371 (c)(1),
(2), (4) Date: Dec. 13, 2012

(87) PCT Pub. No.: WO2011/124807
PCT Pub. Date: Oct. 13, 2011

(65) Prior Publication Data
US 2013/0087241 A1      Apr. 11, 2013

(30) Foreign Application Priority Data
Mar. 30, 2010   (FR) ...................... 10 52311

(51) Int. Cl.
*F16L 9/22*   (2006.01)
*F03G 7/05*   (2006.01)
*F16L 9/12*   (2006.01)
*F16L 9/128*  (2006.01)

(52) U.S. Cl.
CPC ... *F16L 9/22* (2013.01); *F03G 7/05* (2013.01); *F16L 9/12* (2013.01); *F16L 9/128* (2013.01); *Y02E 10/34* (2013.01)

(58) Field of Classification Search
USPC .................. 138/153, 125; 405/160, 162, 171
See application file for complete search history.

(56) References Cited

U.S. PATENT DOCUMENTS

| | | | |
|---|---|---|---|
| 3,574,104 A * | 4/1971 | Medler | 428/222 |
| 3,586,059 A * | 6/1971 | Tanabe et al. | 138/143 |
| 3,854,504 A * | 12/1974 | Morrison et al. | 138/141 |
| 3,871,408 A | 3/1975 | Wood et al. | |
| 4,013,102 A * | 3/1977 | DeLorean et al. | 138/144 |
| 4,680,213 A | 7/1987 | Fourezon | |
| 5,021,283 A * | 6/1991 | Takenaka et al. | 428/116 |
| 5,305,821 A * | 4/1994 | Weingartner | 165/10 |
| 5,330,294 A * | 7/1994 | Guesnon | 405/224.2 |
| 6,848,863 B2 * | 2/2005 | Karayaka et al. | 405/211 |
| 7,037,865 B1 * | 5/2006 | Kimberly | 442/181 |
| 8,450,225 B2 * | 5/2013 | Restuccia et al. | 442/329 |
| 2002/0162597 A1 | 11/2002 | Radlinger | |
| 2005/0241717 A1 * | 11/2005 | Hallot et al. | 138/149 |
| 2005/0281999 A1 * | 12/2005 | Hofmann et al. | 428/304.4 |
| 2010/0009159 A1 * | 1/2010 | Kimberly | 428/222 |
| 2010/0263761 A1 * | 10/2010 | Niccolls et al. | 138/146 |
| 2011/0017516 A1 * | 1/2011 | Gollmyer et al. | 175/325.7 |
| 2013/0291991 A1 * | 11/2013 | Ruby et al. | 138/144 |

\* cited by examiner

*Primary Examiner* — James Hook
(74) *Attorney, Agent, or Firm* — Davidson, Davidson & Kappel, LLC

(57) ABSTRACT

A pipe for drawing up cold water for a marine thermal energy plant is produced from a composite material including glass fiber reinforcements and a thermosetting resin.

7 Claims, 2 Drawing Sheets

PIPE FOR DRAWING UP COLD WATER FOR A MARINE THERMAL ENERGY PLANT

The present invention relates to a pipe for drawing up cold water for a marine thermal energy plant.

BACKGROUND

Such a marine thermal energy plant generally includes a floating platform on which means are placed for producing electricity from the temperature difference in the surface and deep water, said platform also being associated with means forming a pipe for drawing cold water up from a depth.

The operating principle of such an OTE (Ocean Thermal Energy) facility consists of using the temperature difference that exists naturally between the surface and deep water of the oceans to run a thermal machine.

Due to the laws of thermodynamics, to have an acceptable efficiency, the implementation of such an OTE facility is only justified with a temperature difference for example greater than 20° C.

Typically, the water can for example be at a temperature of 25° C. on the surface and a temperature of 5° C. at 1000 meters deep.

One can then see that this limits the use of such facilities to specific areas, for example such as tropical areas.

The cold water must then be pumped at a very significant depth through means forming a suction pipeline associated with the platform, while the hot water is pumped on the surface.

Various attempts to develop OTE-based energy production facilities have already been made.

Efforts were for example made by Georges CLAUDE in the 1930s.

Of course, other operators have made attempts since then.

However, the very large majority of these attempts have failed due to various problems, and in particular problems of the mechanical strength of certain elements of those facilities with the environmental conditions encountered.

It is in fact known that in the geographical areas in which these facilities can be installed, particular meteorological conditions may be encountered such as relatively strong ocean currents, storms, etc., which causes the deterioration or even breakage of certain parts of the facility.

In particular, the cold water suction pipe has posed many deformation, or even breakage problems.

SUMMARY OF THE INVENTION

It is an object of the present invention is to resolve these problems.

The present invention provides a pipe for drawing up cold water for an offshore marine thermal energy plant, characterized in that it is produced from a composite material consisting of glass fiber reinforcements and a thermosetting resin, and in that it has several sections of decreasing densities from the lower end toward the upper end thereof.

According to other aspects of the invention, the suction pipe comprises one or more of the following features:
  the resin is polyester or isophthalic vinyl ester,
  at least one layer of honeycomb material is incorporated into the wall of the pipe,
  the honeycomb material is formed from a three-dimensional woven textile,
  the textile is made from glass fibers.

BRIEF DESCRIPTION OF THE DRAWINGS

The invention will be better understood using the following description, provided solely as an example and done in reference to the appended drawings, in which.

DETAILED DESCRIPTION

Figure 1:
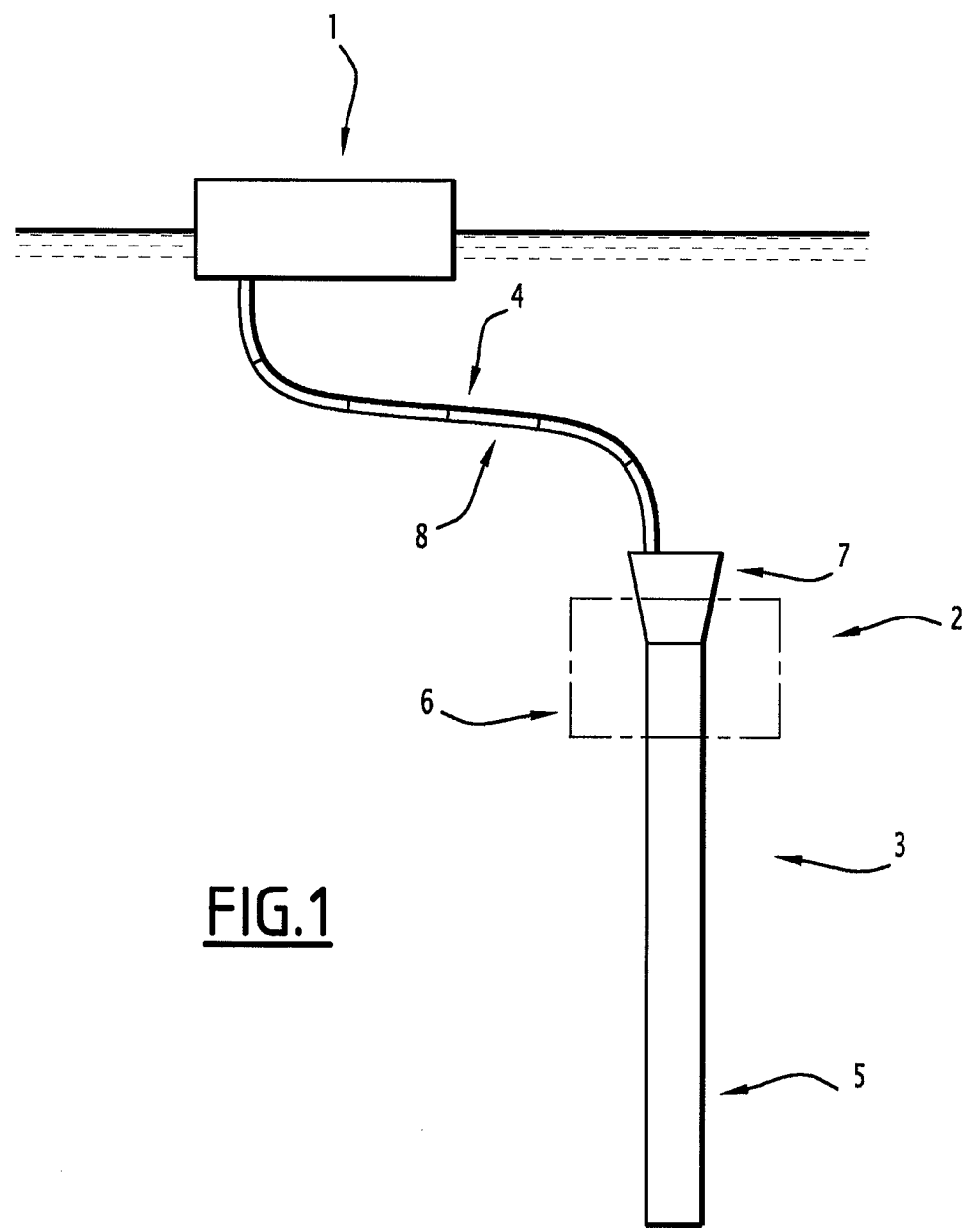
FIG. 1 shows a summary diagram illustrating the general structure of an OTE facility.

FIG. 1 shows an offshore electricity production facility in the context of ocean thermal energy, called OTE.

In general, such a facility includes a floating platform designated by general reference 1 in this figure, on which means are placed for producing electricity using the temperature difference between the surface and deep water.

These means not being part of the invention, they will not be described in more detail hereafter.

As previously indicated, such a facility requires pumping hot water from or near the surface and cold water from a very significant depth, for example such as between 600 and 1200 meters deep.

This hot water and cold water then make it possible to run the electricity production means from the temperature difference in that water.

To that end, the floating platform 1 is associated with means forming a pipe for drawing up water from a depth.

These means are designated by general reference 2 in that figure and for example include two parts, respectively designated using references 3 and 4 in said FIG. 1.

One of these parts, designated by general reference 3, is made up of a rigid pipe designated by general reference 5, the lower end of which is submerged at a significant depth, for example between 600 and 1200 meters deep and the upper end of which is submerged between two water levels at a smaller depth, for example several meters or tens of meters, as illustrated.

This upper end of said rigid pipe is then for example associated with means forming a buoy or support float designated by general reference 6 in said FIG. 1, making it possible to keep that rigid pipe in position and with collector means designated by general reference 7, making it possible to connect the upper end of the rigid pipe 5 to the platform 1, using a second part of the suction pipe means, said second part being formed by flexible pipes for connecting said upper end of the rigid pipe to the platform 1.

One of these flexible pipes is designated by general reference 8 in said FIG. 1.

The subject-matter of the invention is in fact the rigid suction pipe portion making it possible to draw up cold ocean water from a significant depth.

In fact, the latter is made from a composite material made up of glass fiber reinforcements and a thermosetting resin.

This thermosetting resin is made of polyester or isophthalic vinyl ester.

It will be noted that one or more layers of a honeycomb material may also be integrated into the wall of the pipe.

This honeycomb material can for example be made up of a three-dimensional woven textile, for example including the textile called PARABEAM® and manufactured by the company of the same name.

In fact, this woven textile can also be made from glass fibers.

Such a pipe can also be made in situ by a corresponding production facility by winding and crosslinking around a corresponding mandrel.

It will also be noted that the pipe can have several sections of different densities such as, for example, decreasing densities from the lower end toward the upper end thereof so as to adapt the density of the pipe to the density of the water to end with a pipe having practically zero buoyancy.

Such a structure is particularly well-suited to the considered application having a manufacturing time compatible with an in situ production of the pipe while having mechanical characteristics compatible with the considered application.

Figure 2:
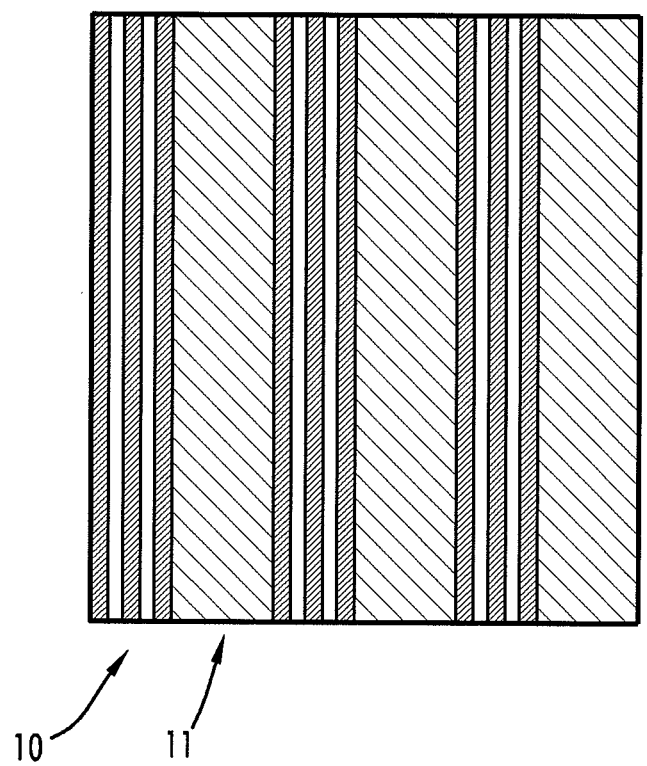
FIG. 2 shows a cross-sectional view of a wall portion of a pipe for drawing up cold water comprised in the make-up of such a facility.

FIG. 2 shows an example embodiment of such a pipe, which then for example has superimposed fiber reinforcements designated by general reference 10 in that figure and layers of honeycomb material such as three-dimensional woven textile, designated by general reference 11.

Other embodiments can of course be considered.

What is claimed is:

1. A pipe for drawing up cold water for an offshore marine thermal energy plant produced from a composite material including glass fiber reinforcements and a thermosetting resin, the pipe comprising:
several sections of decreasing densities from a lower end of the pipe toward an upper end of the pipe, the lower end of the pipe being submerged at a significant depth, between 600 and 1200 meters deep, and an upper end of the pipe being submerged between two water levels at a smaller depth, of several meters or tens of meters, the sections of the pipe decreasing in density from the lower end to the upper end of the pipe so as to adapt the density of the pipe to the density of the water.

2. The suction pipe as recited in claim 1 wherein the resin is polyester or isophthalic vinyl ester.

3. The suction pipe as recited in claim 1 further comprising at least one layer of honeycomb material incorporated into a wall of the pipe.

4. The suction pipe as recited in claim 3 wherein the honeycomb material is formed from a three-dimensional woven textile.

5. The suction pipe as recited in claim 4 wherein the textile is made from glass fibers.

6. The suction pipe as recited in claim 1 wherein the composite material consists of glass fiber reinforcements and a thermosetting resin.

7. The suction pipe as recited in claim 1 wherein said pipe has approximately zero buoyancy.

* * * * *